United States Patent Office 2,877,224
Patented Mar. 10, 1959

2,877,224

3-CYANO SUBSTITUTED PHENOTHIAZINES

Robert Michel Jacob, Ablon-sur-Seine, and Jacques Georges Robert, Gentilly, France, assignors to Société des Usines Chimiques Rhone-Poulenc, Paris, France, a corporation of France No Drawing. Application November 8, 1956
Serial No. 620,998

Claims priority, application France November 15, 1955

6 Claims. (Cl. 260—243)

This invention relates to new derivatives of phenthiazine and to processes for their production.

It is known that various 10-aminoalkyl-phenthiazines possess interesting therapeutic properties. Extensive research and experimentation has shown, however, that both the size of the therapeutic index and the nature of the therapeutic effect exhibited by certain compounds of this type can radically be changed (even eliminated) by even small changes in chemical structure. Particularly is this the case with variations in the nature and length of the side chain attached to the 10-position nitrogen atom and with positional substitution in the phenthiazine nucleus.

It has now unexpectedly been discovered that the hitherto unknown phenthiazine derivatives of the general formula:

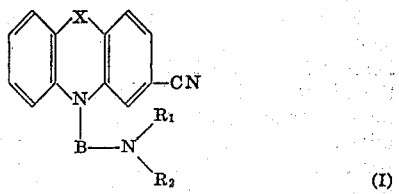

(I)

and their salts and their quaternary ammonium derivatives (wherein X represents a sulphur atom or an SO or $SO_2$ group, $R_1$ and $R_2$ are the same or different and either each represents a lower alkyl group or one of $R_1$ and $R_2$ represents a hydrogen atom and the other represents a lower alkyl group or $R_1$ and $R_2$ together with the adjacent nitrogen atom collectively represent a heterocyclic group such as pyrrolidino, piperidino, morpholino, piperazino and 4-alkylpiperazino, and B represents a straight or branched chain divalent aliphatic hydrocarbon group containing 2 to 5 carbon atoms unsubstituted or substituted by a group

wherein A represents a single bond or —$CH_2$— and $R_1$ and $R_2$ are as hereinbefore defined) possess valuable pharmacodynamic properties. Some, in particular those derivatives in which the grouping

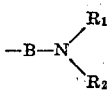

represents

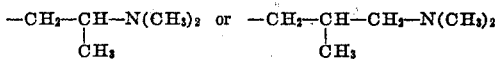

are powerful antihistaminics. Others, in particular those in which the grouping

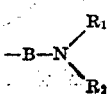

represents

—$(CH_2)_3N(CH_3)_2$ or —$CH_2$—CH—$CH_2N(CH_3)_2$
                                         |
                                        $CH_3$ are very active potentiators of narcotics and inhibitors of the vegetative nervous system and are superior in this respect to known 10-aminoalkylphenthiazine compounds. Those derivatives in which the chain B carries another amino group

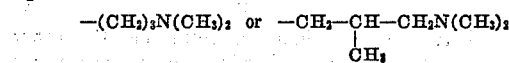

such as

—$CH_2$—CH—$CH_2N(CH_3)_2$
        |
      $N(CH_3)_2$ are particularly interesting as spasmolytics and local anaesthetics. Those derivatives in which

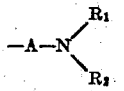

represents

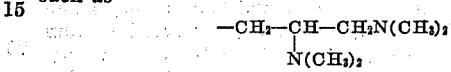

or

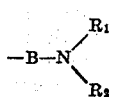

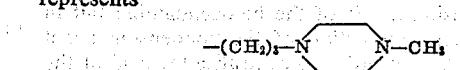

are particularly interesting as antiemetics and inhibitors of the central nervous system. Others are antiemetics, spasmolytics or hypotensors.

The term "lower alkyl" as used in this specification and in the appended claims means that the alkyl group contains not more than five carbon atoms.

The new compounds of the present invention may be prepared in a variety of different ways of which the more important can be expressed generically as comprising the interaction of a phenthiazine compound containing a structure represented by the formula:

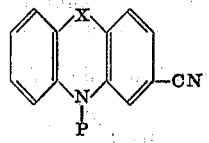

(II)

with a compound Q, the group P and the compound Q being such that Q will react with the compound of the foregoing formula to introduce or form at the 10-position of the ring a substituent grouping of the structure:

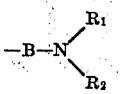

(III)

or a grouping convertible thereto, wherein X, B, $R_1$ and $R_2$ are as hereinbefore defined.

Specific embodiments of the general process defined in the last preceding paragraph are as follows:

(1) Interaction of a phenthiazine compound of the formula:

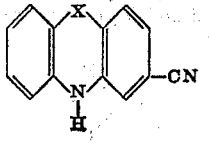

(IV)

with a halogenoamine of the formula:

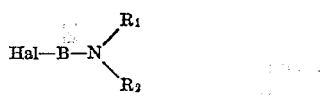

(where Hal represents a halogen atom and the other symbols are as hereinbefore defined). In the case where $R_1$ represents a hydrogen atom and $R_2$ represents a lower alkyl group it is advantageous to carry out the reaction with an N-acyl derivative of the halogenoamine and subsequently to hydrolyse the product obtained.

The reaction may be carried out with or without a solvent in the presence or absence of a condensing agent. It is advantageous to operate in an aromatic hydrocarbon solvent (for example, toluene or xylene) in the presence of a condensing agent, preferably in the form of an alkali metal or derivative thereof (such as, for example, hydride, amide, hydroxide, alcoholate or metal alkyl or aryl) and especially metallic sodium, sodamide, powdered sodium or potassium hydroxide, lithium hydride, sodium tert-butylate, butyl lithium and phenyl lithium. The reaction is preferably carried out at the boiling temperature of the solvent. It is advantageous to use the halogenoamine in the form of the free base in solution, for example, with benzene, toluene or xylene, and to add this to the mixture of the other reactants in which the 3-cyanophenthiazine may already be present at least in part, in the form of an alkali metal salt. The reaction may also be carried out using a salt of the halogenoamine but in this case a greater proportion of the condensing agent must clearly be used in order to neutralise the acid of the salt employed.

In the case where the divalent aliphatic hydrocarbon group —B— is an asymetric branched chain, such for example, as $$-CH_2-CH-, \quad -CH-CH_2-$$
$$\quad\quad\;\; CH_3 \quad\quad\;\; CH_3$$

$$-CH-CH_2-CH_2-CH_2-CH_2-CH-$$
$$\;\; CH_3 \quad\quad\quad\quad\quad\quad\quad\quad CH_3$$

isomerisation can take place during the course of the reaction. This isomerisation is analogous to that which takes place in the preparation of promethazine by the condensation of phenthiazine with a dimethylaminohalogenopropane [Charpentier, C. R., 225, 306 (1947)], which gives with 2-dimethylamino-1-chloropropane or with 1-dimethylamino-2-chloropropane as starting material the same final mixture in which promethazine predominates.

(2) Condensation of an amine of the formula

(wherein $R_1$ and $R_2$ are as hereinbefore defined) with a phenthiazine derivative of the general formula:

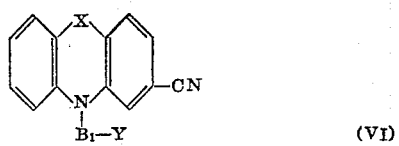

wherein X is as hereinbefore defined, Y represents a residue of a reactive ester, such as a halogen atom or a residue of a sulphuric or sulphonic ester, and $B_1$ represents a straight or branched divalent aliphatic hydrocarbon group containing 2 to 5 carbon atoms or such a grouping substituted by a group —A—$Y_1$, A being as hereinbefore defined and $Y_1$ being a residue of a reactive ester or a grouping

(3) In the case of compounds in which $R_1$ represents a hydrogen atom and $R_2$ represents a lower alkyl group or $R_1$ and $R_2$ both represent lower alkyl groups, alkylation by known methods (for example, methylation with formaldehyde and hydrogen in the presence of a catalyst) of the corresponding primary or secondary amines. It is sometimes more advantageous to carry out the alkylation in two stages, by acylation followed by reduction, and these two operations may be carried out simultaneously in certain cases.

Alternative processes for the preparation of the compounds of this invention are:

(4) Decomposition of a phenthiazine-10-carboxylate of an aminoalcohol of the formula:

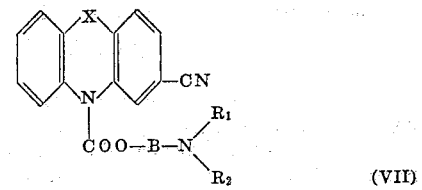

(wherein the various symbols are as hereinbefore defined) by heating the carboxylate to a temperature above 100° C., and preferably between 150 and 220° C. There is no advantage in operating at higher temperatures which, in any event, can cause discoloration of the reaction products.

The reaction can be effected with the phenthiazine-10-carboxylate alone, i. e. without a diluent, or in an inert medium such as liquid paraffin, diphenyl or diphenyl oxide, or in the classical diluents for decarboxylation, such, for example, as quinoline or weak bases with a sufficiently high boiling point.

During the course of the decomposition of the phenthiazine-10-carboxylate an isomerisation, similar to that hereinbefore described in process (1) takes place when the divalent aliphatic hydrocarbon group B is an asymmetric branched chain and a mixture of isomers is obtained. Separation of the isomers may be effected by, for example, fractional crystallisation of salts such as the hydrochlorides from a suitable solvent such as alcohol.

The phenthiazine-10-carboxylates employed as starting materials may be obtained by known methods. For example, they may be prepared by the action of a halide (or an ester) of a 3-cyanophenthiazine-10-carboxylic acid of formula:

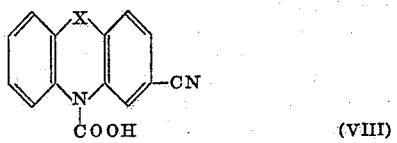

(wherein X is as hereinbefore defined) on the appropriate aminoalcohol; or by the action on a halogenoalkyl ester of such an acid on an appropriate secondary amine.

(5) Cyclisation, preferably in a solvent in the form of a substituted amide of a lower aliphatic acid (such as formamide or acetamide) or dimethylaniline in the presence of a condensing agent (e. g. alkali metal hydroxide or carbonate) and, if desired, in the presence of a catalyst such as copper powder, of a compound of the general formula:

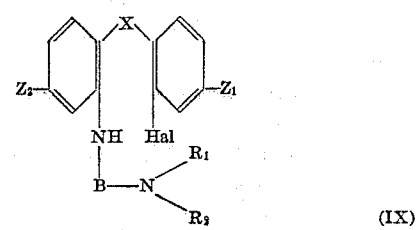

(wherein one of the symbols $Z_1$ and $Z_2$ represents a hydrogen atom and the other represents a cyano group, Hal represents a halogen atom (for example, chlorine or bromine) and the other symbols are as hereinbefore defined).

(6) In the cases where X represents a sulphur atom cyclisation with sulphur, or a halogeno derivative thereof, of a diphenylamine of the general formula:

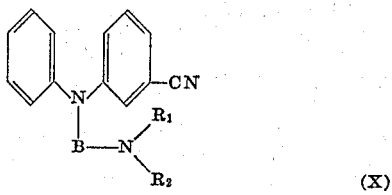

(wherein B, $R_1$ and $R_2$ are as hereinbefore defined).

(7) In the cases where X represents an SO or $SO_2$ group, oxidation by known methods of the corresponding phenthiazine compounds (X=S) of general formula I. This oxidation may be effected, for example, by means of hydrogen peroxide in the presence of acetic acid or with nitric acid.

Certain compounds conforming to general formula I which contain branched chains, such as

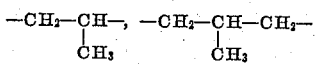

can exist in optically active forms, and the invention includes within its scope the racemates as well as the corresponding optically active isomers of such compounds. The optically active isomers may be obtained by certain of the methods described above by commencing with starting materials which are themselves optically active. They may also be prepared by resolution of the corresponding racemates.

For therapeutic purposes, the bases of general formula I are preferably employed in the form of acid addition salts containing pharmaceutically acceptable anions (such as hydrochlorides and other hydrohalides, 8-chlorotheophyllinates, phosphates, nitrates, sulphates, maleates, fumarates, citrates, tartrates, oxalates, methane sulphonates and ethane disulphonates) or of quaternary ammonium salts obtained by reaction with organic halides (e. g. methyl or ethyl iodide, chloride or bromide or allyl or benzyl chloride or bromide) or other reactive esters.

The following examples show how the invention may be put into practice. The melting points, unless otherwise indicated, are those determined on the Kofler bench.

Example I

A solution of 3-cyanophenthiazine (16.3 g.) in anhydrous xylene (100 cc.) is heated under reflux and treated with 95% sodamide (3.45 g.). Heating is continued for 1 hour and then a solution of 1-dimethylamino-3-chloropropane (10.2 g.) in xylene (100 cc.) is added over 15 minutes. The mixture is heated under reflux for 2 hours. A further solution of 1-dimethylamino-3-chloropropane (10.2 g.) in xylene (100 cc.) is added, heating is continued for a further 3 hours and the mixture cooled. The reaction mixture is treated with water (50 cc.) and N methanesulphonic acid (190 cc.). The xylene phase is removed and the aqueous phase is made alkaline with sodium hydroxide (d.=1.33; 25 cc.). The free base obtained is extracted with ether and the ether extracts are dried over anhydrous potassium carbonate and concentrated to dryness. The residue is distilled in vacuo. 3-cyano-10-(3 - dimethylaminopropyl)phenthiazine (11.5 g.) is obtained, B. P. 200–215° C./1 mm. Hg, M. P. 80° C.

The acid maleate prepared in ethyl acetate and recrystallised from methanol melts at 188–189° C.

Example II

A solution of 3-cyanophenthiazine (10 g.) in anhydrous xylene (75 cc.) is heated under reflux and treated with 95% sodamide (2.15 g.). The heating is continued for 1 hour and then a solution of 1-dimethylamino-2-methyl-3-chloropropane (7.05 g.) in xylene (70 cc.) is added over 15 minutes. The mixture is heated under reflux for 20 hours and then cooled. The reaction mixture is treated with water (40 cc.) and N methanesulphonic acid (75 cc.). The xylene phase is removed and the aqueous phase is made alkaline with sodium hydroxide. The free base obtained is extracted with ether and the ethereal extracts are dried over anhydrous potassium carbonate and concentrated to dryness. The residue is distilled in vacuo. 3-cyano-10-(3-dimethylamino-2-methylpropyl)phenthiazine (8.5 g.), B. P. 180–205° C./0.9 mm. Hg, is thus obtained.

The acid maleate prepared in and recrystallised from ethanol melts at 204–205° C.

The 3-cyanophenthiazine used as starting material in the preceding examples can be prepared by the action of cupric cyanide on 3-chlorophenthiazine in boiling quinoline. It has a first melting point of about 185° C. and a second of about 203–205° C.

Example III

A solution of 3-cyanophenthiazine (11.2 g.) in anhydrous xylene (75 cc.) is heated under reflux and treated with 95% sodamide (2.45 g.). Heating is continued for 1 hour and then a solution of 1-(4-methyl-1-piperazinyl)-3-chloropropane (10.6 g.) in xylene (80 cc.) is added over 45 minutes. Heating under reflux is continued for 4 hours and the mixture is then cooled. The reaction mixture is treated with water (50 cc.) and N methanesulphonic acid (90 cc.). The xylene phase is removed and the aqueous phase is made distinctly alkaline with an excess of sodium hydroxide (d.=1.33). The free base obtained is extracted in 3 parts with chloroform (375 cc.), the chloroform extracts are dried over anhydrous potassium carbonate and concentrated to dryness and the residue distilled in vacuo. 3-cyano-10-(3-4'-methyl-1'-piperazinylpropyl)phenthiazine (10 g.), B. P. 260–280° C./0.9 mm. Hg, is thus obtained.

The dihydrochloride is prepared and crystallised from ethanol as a slightly yellow crystalline powder, M. P. 240–250° C.

Example IV

A solution of 3-cyanophenthiazine (11.2 g.) in anhydrous xylene (75 cc.) is heated under reflux and treated with 95% sodamide (2.45 g.). Heating is continued for 1 hour and then a solution of 1-dimethylamino-2-chloropropane (7.3 g.) in xylene (55 cc.) is added over 45 minutes. The mixture is heated under reflux for 4 hours and then treated as in Example III. 3-cyano-10-(2-dimethylamino-1-propyl)phenthiazine (11 g.) is thus obtained, B. P. 186–228° C./1.2 mm. Hg, M. P. 91–92° C.

The acid maleate, prepared in ethanol and recrystallised from methanol, melts at 210° C.

Example V

A solution of 3-cyanophenthiazine (20 g.) in anhydrous xylene (200 cc.) is heated under reflux and treated with 95% sodamide (3.7 g.). Heating is continued for 80 minutes and then a solution of 1-(4-methyl-1-piperazinyl)-2-methyl-3-chloropropane (19.4 g.) in xylene (200 cc.) is added over 15 minutes. The mixture is heated under reflux for 23 hours and cooled. After cooling, the mixture is treated as in Example III, replacing the methanesulphonic acid with 4 N hydrochloric acid. After distillation in vacuo a brown ochre oil (10.2 g.) is obtained, B. P. 237–246° C./0.5 mm. Hg.

The oil thus obtained is dissolved in a mixture (500 cc.) of 9 parts of cyclohexane and 1 part of benzene and filtered through an alumina column (30 g.). After filtration, the alumina is washed with benzene (100 cc.). The filtrates are combined, concentrated to dryness and the residue is recrystallised from petroleum ether (50 cc.). 3 - cyano - 10 - (3 - 4' - methyl - 1' - piperazinyl - 2 - methyl - 1 - propyl)phenthiazine (7.2 g.), M. P. 116° C., is thus obtained.

*Example VI*

Sodamide (4.5 g.) is added to a solution of 3-cyanophenthiazine (22.4 g.) in anhydrous xylene (200 cc.) heated to 100° C. The mixture is heated to reflux and a solution of 1:3-bis-dimethylamino-2-chloropropane (18.1 g.) in xylene (350 cc.) is added over half an hour and heating under reflux is continued for a further 4 hours. After cooling, the reaction mixture is acidified with dilute hydrochloric acid, the organic phase is separated, the aqueous phase is made alkaline with excess sodium hydroxide and the liberated base is extracted with ether. After drying over anhydrous potassium carbonate, the ethereal extracts are evaporated to dryness and a thick brown oil (34.5 g.) is obtained. The crude product is dissolved in a mixture of benzene and cyclohexane (1:1; 700 cc.) and the solution is chromatographed over alumina (500 g.) which is eluted successively with a mixture of benzene and cyclohexane, with benzene and with a mixture of benzene and ethyl acetate.

The fractions from the elution with the benzene-cyclohexane mixture are combined and concentrated to dryness. The residue is dissolved in ethanol and a slight excess of maleic acid is added. The salt which crystallises is filtered, washed and recrystallised from methanol. The di-acid maleate of 3-cyano-10-(1:3-bis-dimethylamino-2-propyl)phenthiazine, M. P. 201–204° C., is thus obtained.

The fractions from the elution with the benzene-ethyl acetate mixture are combined and concentrated to dryness. The residue is dissolved in ethanol and a slight excess of maleic acid is added. The salt obtained is filtered, washed and recrystallised from a mixture of methanol and ether and then from isopropanol. The neutral maleate of 3-cyano-10-(2:3 bis-dimethylaminopropyl)phenthiazine, M. P. 168° C., is obtained.

*Example VII*

3 - pyrrolidinopropyl 3 - cyanophenthiazine-10-carboxylate (10.7 g.) is heated between 185–210° C. until the evolution of carbon dioxide ceases. The reaction product is dissolved in ethyl acetate (100 cc.) while still warm and the basic constituents of the solution are extracted by agitation with 0.4 N methanesulphonic acid (95 cc.). After the separation of the organic phase and rewashing with ethyl acetate (100 cc.), the acidic aqueous phase is made distinctly alkaline with excess sodium hydroxide (d.=1.33). The precipitated base is extracted with ether and the ethereal solution is dried over anhydrous potassium carbonate and then evaporated to dryness on the water bath.

The residual crude base (8.3 g.) is dissolved in cyclohexane (500 cc.) and filtered through an alumina column (200 g.). The purified base is then eluted successively with cyclohexane (500 cc.), benzene (1 l.) and a mixture (500 cc.) of 9 parts of benzene to 1 part of ethyl acetate. The residue obtained by evaporation of the solutions from the washing and elution is finally recrystallised from n-heptane. 3-cyano-10-(3-pyrrolidinopropyl)-phenthiazine is thus obtained as a yellow crystalline powder, M. P. 67–68° C.

The hydrochloride, prepared by the addition of ethereal hydrogen chloride to a solution of the base in ethyl acetate, is a yellow crystalline product soluble in water and melting at about 160° C.

The initial 3-pyrrolidinopropyl 3-cyanophenthiazine-10-carboxylate (M. P. 90° C.), the hydrochloride of which melts at 187–188° C., is prepared by heating a solution in toluene of 3-cyanophenthiazine-10-carbonyl chloride (1 mol.) and 3-pyrrolidinopropanol (2 mols.) for 4 hours under reflux.

3-cyanophenthiazine-10-carbonyl chloride, M. P. 147–148° C., is prepared by heating a solution in toluene of 3-cyanophenthiazine and phosgene for 20 hours at 110° C. in a silvered autoclave.

*Example VIII*

2-methyl-3-pyrrolidinopropyl 3-cyanophenthiazine-10-carboxylate (7.4 g.) is heated between 140–185° C. until the evolution of carbon dioxide ceases. The cooled reaction mass is dissolved in ethyl acetate (100 cc.) and the basic constituents of the solution are extracted by agitation with 0.5 N hydrochloric acid (115 cc.). After separation of the organic phase, the aqueous acid phase is made alkaline with 4 N sodium hydroxide solution (20 cc.). The precipitated base is extracted with ether (150 cc.) and the ethereal solution is dried over anhydrous potassium carbonate and evaporated to dryness under a pressure of 20 mm. Hg.

The residual crude base (6.1 g.) is dissolved in cyclohexane (300 cc.) and filtered through an alumina column (120 g.). The fixed base is then eluted with cyclohexane, benzene and finally benzene containing 10% ethyl acetate. The residue from the evaporation of the solutions from the washing and elution is recrystallised from petroleum ether. 3-cyano-10-(2-methyl-3-pyrrolidinopropyl)phenthiazine is thus obtained as a yellow crystalline powder, M. P. 235–240° C.

The initial 2-methyl-3-pyrrolidinopropyl 3-cyanophenthiazine-10-carboxylate, M. P. 70–74° C., is obtained by heating a solution in toluene of 3-cyanophenthiazine-10-carbonyl chloride (1 mol.) and 2-methyl-3-pyrrolidinopropanol (2 mols.) under reflux for 4 hours.

The 3-cyanophenthiazine-10-carbonyl chloride is prepared as described in Example VII.

*Example IX*

2-diethylaminoethyl 3-cyanophenthiazine-10-carboxylate (4 g.) is heated under reflux in o-dichlorobenzene (20 cc.) until evolution of carbon dioxide ceases. After cooling, the solution obtained is diluted with ether (75 cc.) and extracted in two portions with a total of 75 cc. of 0.2 N hydrochloric acid. The combined aqueous phases are washed with ether (50 cc.) and then made alkaline with sodium hydroxide (d.=1.33; 5 cc.). The precipitated base is extracted with ether (175 cc.) and the ethereal solution is dried with anhydrous potassium carbonate and then evaporated to dryness on the water-bath. The residual solid base (3.5 g.) is finally recrystallised from isopropanol. 3-cyano-10-(2-diethylaminoethyl)phenthiazine is thus obtained as a yellow crystalline powder, M. P. 80° C.

The initial 2-diethylaminoethyl 3-cyanophenthiazine-10-carboxylate, M. P. 90–92° C., is obtained by heating under reflux for 5 hours a solution in toluene of 3-cyanophenthiazine-10-carbonyl chloride (1 mol.) and 2-diethylaminoethanol (2 mols.).

*Example X*

3-diethylamino-2-propyl 3-cyanophenthiazine-10-carboxylate (8.5 g.) is heated under reflux in o-dichlorobenzene (40 cc.) until the evolution of carbon dioxide ceases. After cooling, the solution obtained is diluted with ether (150 cc.) and extracted in two portions with 0.2 N hydrochloric acid (160 cc.). The combined aqueous acid phases are washed with ether (100 cc.) and then made alkaline with sodium hydroxide (d.=1.33; 8 cc.). The precipitated base is extracted with ether (350 cc.) and the ethereal solution is washed with water (200 cc.), dried with anhydrous potassium carbonate and then evaporated to dryness on the water-bath. The solid residual base (6.8 g.) is recrystallised successively from isopropanol and ethanol. 3-cyano-10-(2-diethylaminopropyl)phenthiazine is thus obtained as a yellow crystalline powder, M. P. 112° C.

The initial 3-diethylamino-2-propyl 3-cyanophenthiazine-10-carboxylate is obtained by heating for 5 hours under reflux a solution in toluene of 3-cyanophenthiazine-10-carbonyl chloride (1 mol.) and 1-diethylamino-2-propanol (2 mols.). The crude oily base obtained dissolved in a mixture of equal parts of petroleum ether and cyclohexane is purified only by filtration on an alumina column, and is utilised directly for the reaction.

Example XI

1:3-dipiperidino-2-propyl 3-cyanophenthiazine-10-carboxylate (7.9 g.) is heated under reflux in o-dichlorobenzene (25 cc.) until the evolution of carbon dioxide ceases. After cooling the solution obtained is treated as described in Examples IX and X. The crude oily base obtained (5.3 g.) is dissolved in isopropanol (100 cc.) and the solution is added over 15 minutes to a luke-warm solution of tartaric acid (3.6 g.) in isopropanol (100 cc.). On cooling, the ditartrate crystallises slowly. After filtration and drying, the ditartrate is obtained (6.9 g.), M. P. approx. 120° C.

The aforesaid salt is dissolved in water (50 cc.), the solution is made alkaline with sodium hydroxide (5 cc.) and the free base is extracted with ether (150 cc.). The ethereal solution is washed with water (100 cc.), dried with anhydrous potassium carbonate and evaporated to dryness on the water-bath. The crystalline yellow residue (4 g.) is finally crystallised from isopropanol. 3-cyano-10-(2:3-dipiperidinopropyl)phenthiazine is thus obtained as a yellow crystalline powder, M. P. 108° C.

The initial 1:3-dipiperidino-2-propyl 3-cyanophenthiazine-10-carboxylate, M. P. 100–105° C. is obtained by heating under reflux for 3 hours a solution in toluene of 3-cyanophenthiazine-10-carbonyl chloride (1 mol.) and 1:3-dipiperidino-2-propanol (1 mol.).

Example XII

A solution of 3-(3-cyano-10-phenthiazinyl)propyl toluene-p-sulphonate (1.5 g.) and monoethylamine (10 g.) in anhydrous toluene (30 g.) is heated for 18 hours at 100° C. in a glass pressure bottle. After cooling, the reaction mass is concentrated to dryness under a pressure of 25 mm. Hg. The residue is taken up in a mixture of equal parts of ether and ethyl acetate (50 cc.) and extracted with 0.2 N hydrochloric acid (60, 60 and 30 cc. successively). The combined aqueous acid phases are washed with ether (50 cc.) and made alkaline with sodium hydroxide (d.=1.33; 5 cc.). The precipitated base is extracted with ether (120 cc.), the ethereal solution is washed with water (60 cc.), dried with anhydrous potassium carbonate and concentrated to dryness on a water-bath. The oily residue (1.1 g.) is dissolved in luke-warm ethyl acetate (20 cc.) and the solution obtained is added to a luke-warm solution of maleic acid (0.4 g.) in ethyl acetate (5 cc.). The salt which crystallises on cooling is filtered off, washed with ethyl acetate, dried and recrystallised from methanol. 3-cyano-10-(3-monoethylaminopropyl)phenthiazine acid maleate is obtained as a cream crystalline powder, M. P. 230° C.

3-(3-cyano-10-phenthiazinyl)propyl toluene-p-sulphonate, M. P. 157° C., is obtained by condensation of toluene-p-sulphonyl chloride with 3-cyano-10-(3-hydroxypropyl)phenthiazine in the presence of pyridine. 3-cyano-10-(3-hydroxypropyl)phenthiazine, M. P. 141° C., is obtained by hydrolysis with hydrochloric acid of 3-cyano-10-(3-tetrahydropyranyloxypropyl)phenthiazine, M. P. 105–108° C., itself obtained by the condensation of 1-tetrahydropyranyloxy-3-chloropropane with 3-cyanophenthiazine in the presence of sodamide in boiling xylene.

Example XIII

A solution of 3-(3-cyano-10-phenthiazinyl)propyl toluene-6-sulphonate (1.9 g.) and piperidine (10 g.) in anhydrous toluene (40 cc.) is heated for 18 hours at 100° C. in a glass pressure bottle. After cooling, the reaction product is treated as in the preceding example. The crude base obtained (1.2 g.) solidifies slowly. It is recrystallised successively from isopropanol and heptane. 3-cyano-10-(3-piperidinopropyl)phenthiazine is thus obtained as a yellow crystalline product, M. P. 78° C.

Example XIV

Optically active 3-cyano-10-(3-N-formyl-N-methyl-amino-2-methyl-1-propyl)phenthiazine (41 g.) is dissolved in methanol (410 cc.). 4 N hydrochloric acid (82 cc.) is added and the mixture is heated under reflux for 5 hours. The methanol is then evaporated and the residue is diluted with water (200 cc.), extracted with ether and made alkaline with an excess of potassium carbonate. An oil separates which is extracted with ether, and on evaporation of the ether there remains a dark oil which is purified by passage in benzene solution over a column of alumina followed by crystallisation of the maleate of the base from ethyl acetate. There is thus obtained a maleate of 3-cyano-10-(3-monomethylamino-2-methyl-1-propyl)phenthiazine which has the following characteristics: M. P.=170° C., $[\alpha]_D^{17}=-12.7°$ (c.=1.2%; chloroform).

The starting material is obtained by the condensation of the sodium derivative of 3-cyanophenthiazine with 3-N-formyl-N-methylamino-2-methyl-1-chloropropane, B. P. 141–143° C./23 mm. Hg, in xylene under reflux. This halogeno-amide is obtained by the action of thionyl chloride in chloroform in the presence of anhydrous pyridine upon 3-N-formyl-N-methylamino-2-methyl-1-propanol, B. P. 124–127° C./0.6 mm. Hg. The amido-alcohol is obtained by the action of formamide under reflux upon 3-monomethylamino-2-methylpropanol, B. P.= 80–89° C./18 mm. Hg, $[\alpha]_D^{20}=-3.5°$ (pure material). This amino-alcohol is obtained by the reduction with lithium aluminium hydride of benzyl 3-monomethylamino-2-methylpropionate, which has the optical activity $[\alpha]_D^{20}=+18.4°$ (c.=5%, chloroform). The optically active ester is obtained by the resolution of the racemic product with the aid of camphosulphonic acid (Reychler's acid). The racemic product is obtained by transesterification of the known methyl ester.

Example XV 3-cyano-10-(3-monomethylamino-2-methyl-1-propyl)-phenthiazine base (0.80 g.), liberated from the maleate described in the preceding example, is dissolved in methanol (30 cc.) with N aqueous hydrochloric acid (3 cc.), a 30% aqueous solution of formaldehyde (5 cc.) and crystalline aluminium chloride (0.40 g.). Adams' platinum catalyst (0.10 g.) is added and the mixture is agitated at room temperature under a slight pressure of hydrogen. When the theoretical quantity of hydrogen has been absorbed, the catalyst is filtered off, the solvent is evaporated and the residue is treated with water. The aqueous solution is then made alkaline, extracted with ether and the ethereal solution is dried. On evaporation of the ether there remains an oily residue (0.8 g.) which in ethanolic solution gives with maleic acid (0.65 g.) a maleate melting at 200–204° C. The 3-cyano-10-(3-dimethylamino-2-methyl-1-propyl)phenthiazine base liberated from the maleate is resinous. It has the following optical activity: $[\alpha]_D^{17}=+16°$ (c.=4% chloroform).

Example XVI

Proceeding in exactly the same manner as in Example XIV but commencing with laevorotatory benzyl 3-monomethylamino-2-methylpropionate in chloroform, there is finally obtained a maleate of 3-cyano-10-(3-monomethylamino-2-methyl-1-propyl)phenthiazine, M. P. 170° C. and $[\alpha]_D^{17}=+12°$ (c.=1%, chloroform).

Example XVII

Proceeding in the same manner as in Example XV but commencing with the maleate of 3-cyano-10-(3-monomethylamino-2-methyl-1-propyl)phenthiazine described in Example XVI, there is obtained laevorotatory 3-cyano-10 - (3 - dimethylamino-2-methyl-1-propyl)phenthiazine base having the following optical activity: $[\alpha]_D^{17} = -16°$ (c.=4%, chloroform).

*Example XVIII*

3-cyano-10-(2-methyl - 3 - dimethylaminopropyl)phenthiazine (5 g.) in glacial acetic acid (25 cc.) is heated at 60° C. until solution is complete. After cooling to 20° C. there is run in over 15 minutes a solution of pure sulphuric acid (d.=1.83; 2.16 g.) in glacial acetic acid (25 cc.) followed by a solution of 34% hydrogen peroxide (3.9 cc.) in glacial acetic acid (6.5 cc.), the temperature being kept at about 20° C. The mixture is then heated at 60° C. for 16 hours. After cooling, the reaction mixture is poured on to ice (200 g.) and the solution obtained is made alkaline with aqueous sodium hydroxide (d.=1.33; 120 cc.). The base which is precipitated is extracted with ethyl acetate (200 cc.) and is dried over potassium carbonate and concentrated to dryness. The solid residue (4.5 g.) is finally recrystallised from ethanol and there is thus obtained 3-cyano-9:9-dioxy-10-(2-methyl-3-dimethylaminopropyl)phenthiazine as a creamy white crystalline powder, M. P. 166° C.

*Example XIX*

2 - bromo-2'(3-dimethylamino-2-methylpropyl)amino-4'-cyanodiphenyl sulphite (6 g.), potassium carbonate (2.5 g.), copper powder (0.2 g.) and dimethylformamide (35 cc.) are heated under reflux for 56 hours at 155° C. After cooling, the mixture is filtered and the solvent is evaporated. The usual treatment yields an oil (2.4 g.) which is treated with maleic acid in ethanol. There is thus obtained the acid maleate (2.5 g.) of 3-cyano-10-(3-dimethylamino-2-methylpropyl)phenthiazine, M. P. about 206–207° C. after recrystallisation from ethanol.

The 2-bromo-2'-(3-dimethylamino - 2 - methylpropyl)-amino - 4' - cyanodiphenyl sulphite (B. P.=195–198° C./0.25 mm. Hg) may be obtained by the condensation in the presence of sodamide of 1-chloro-2-methyl-3-dimethylaminopropane with 2-bromo-2'-amino-4'-cyanodiphenyl sulphite (M. P.=127° C.) which is itself obtained by the reduction with iron/acetic acid of 2-bromo-2'-nitro-4'-cyanodiphenyl sulphite (M. P.=96° C.). This last-mentioned product may be prepared by the diazotisation and treatment with cuprous bromide of 2-amino-2'-nitro-4'-cyanodiphenyl sulphite (M. P.=116° C.), itself obtained by the condensation of 3-nitro-4-chlorobenzonitrile with 2-aminothiophenol in the presence of sodium ethylate.

We claim:

1. A phenthiazine compound having the basic structural formula:

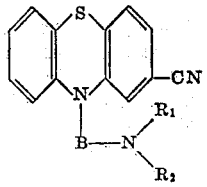

where B is a grouping selected from the class consisting of divalent saturated straight chain and branched chain aliphatic hydrocarbon groupings containing 2 to 5 carbon atoms and

represents a group selected from the class consisting of monomethylamino, monoethylamino, dimethylamino, diethylamino, pyrrolidino, piperidino, morpholino, piperazino and 4-alkyl-piperazino groups of which the alkyl group contains 1 to 4 carbon atoms.

2. 3-cyano-10-(3-dimethylaminopropyl)phenthiazine.

3. 3-cyano-10-(3-dimethylamino - 2 - methylpropyl) phenthiazine.

4. 3-cyano-10 - (3-4'-methyl - 1' - piperazinylpropyl)-phenthiazine.

5. 3 - cyano-10-(3-4'-methyl-1'-piperazinyl-2-methyl-1-propyl)phenthiazine.

6. 3-cyano-10-(2-methyl - 3 - pyrrolindinopropyl)phenthiazine.

References Cited in the file of this patent
UNITED STATES PATENTS

| | | |
|---|---|---|
| 2,272,498 | Zerweck et al. | Feb. 18, 1942 |
| 2,534,237 | Cusic | Dec. 19, 1950 |
| 2,789,978 | Rath | Apr. 23, 1957 |